United States Patent
Bodas et al.

(10) Patent No.: US 9,939,834 B2
(45) Date of Patent: Apr. 10, 2018

(54) CONTROL OF POWER CONSUMPTION

(71) Applicant: Intel Corporation, Santa Clara, CA (US)

(72) Inventors: Devadatta V. Bodas, Federal Way, WA (US); Muralidhar Rajappa, Chandler, AZ (US); Justin J. Song, Olympia, WA (US); Andy Hoffman, Olympia, WA (US); Michael K. Patterson, Dupont, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/582,985

(22) Filed: Dec. 24, 2014

(65) Prior Publication Data

US 2016/0187906 A1    Jun. 30, 2016

(51) Int. Cl.
| | |
|---|---|
| G05F 1/66 | (2006.01) |
| G05B 15/02 | (2006.01) |
| G06F 1/32 | (2006.01) |
| G06F 9/46 | (2006.01) |

(52) U.S. Cl.
CPC ............ *G05F 1/66* (2013.01); *G05B 15/02* (2013.01); *G06F 1/3203* (2013.01); *G06F 1/329* (2013.01)

(58) Field of Classification Search
None
See application file for complete search history.

(56) References Cited

U.S. PATENT DOCUMENTS

| | | | |
|---|---|---|---|
| 7,210,048 B2 | 4/2007 | Bodas | |
| 7,421,623 B2 | 9/2008 | Haugh | |
| 7,724,149 B2 | 5/2010 | Kettler, III et al. | |
| 8,457,802 B1 * | 6/2013 | Steven | G06Q 10/00 700/291 |
| 8,631,411 B1 | 1/2014 | Ghose | |
| 9,189,273 B2 | 11/2015 | Brochard et al. | |
| 2005/0278520 A1 | 12/2005 | Hirai et al. | |
| 2006/0107262 A1 | 5/2006 | Bodas et al. | |
| 2006/0241880 A1 | 10/2006 | Forth et al. | |
| 2007/0074011 A1 | 3/2007 | Borkar et al. | |
| 2008/0172398 A1 | 7/2008 | Borkenhagen et al. | |
| 2008/0301479 A1 * | 12/2008 | Wood | G06F 1/3203 713/322 |
| 2009/0037926 A1 | 2/2009 | Dinada et al. | |
| 2009/0049313 A1 | 2/2009 | Gooding et al. | |
| 2009/0070611 A1 * | 3/2009 | Bower, III | G06F 1/3203 713/322 |
| 2009/0100437 A1 | 4/2009 | Coskun et al. | |
| 2009/0109230 A1 | 4/2009 | Miller et al. | |

(Continued)

OTHER PUBLICATIONS

International Search Report, PCT No. PCT/US2015/054438, dated Jan. 22, 2016, 4 pages.

(Continued)

*Primary Examiner* — Wynuel Aquino
(74) *Attorney, Agent, or Firm* — International IP Law Group, P.L.L.C.

(57) ABSTRACT

A system and method for computing at a facility having systems of multiple compute nodes to execute jobs of computing. Power consumption of the facility is managed to within a power band. The power consumption may be adjusted by implementing (e.g., by a power balloon) activities having little or no computational output.

22 Claims, 9 Drawing Sheets

(56) References Cited

U.S. PATENT DOCUMENTS

| | | |
|---|---|---|
| 2009/0119233 A1 | 5/2009 | Dunagan et al. |
| 2009/0144566 A1 | 6/2009 | Bletsch et al. |
| 2009/0235097 A1 | 9/2009 | Hamilton et al. |
| 2010/0094475 A1 | 4/2010 | Masters et al. |
| 2011/0010717 A1 | 1/2011 | Yamaoka et al. |
| 2011/0072505 A1 | 3/2011 | Ott |
| 2011/0138395 A1 | 6/2011 | Wolfe |
| 2011/0154348 A1 | 6/2011 | Elnozahy et al. |
| 2011/0185364 A1 | 7/2011 | Fernandes et al. |
| 2011/0231860 A1 | 9/2011 | Kazama et al. |
| 2011/0271283 A1 | 11/2011 | Bell, Jr. et al. |
| 2012/0030493 A1* | 2/2012 | Cepulis ............... G06F 1/324 713/324 |
| 2012/0072389 A1 | 3/2012 | Aldridge et al. |
| 2012/0109705 A1* | 5/2012 | Belady ............ G06Q 10/06312 705/7.22 |
| 2012/0191439 A1 | 7/2012 | Meagher et al. |
| 2013/0042118 A1 | 2/2013 | Robben et al. |
| 2013/0054987 A1 | 2/2013 | Pfeiffer et al. |
| 2013/0086404 A1* | 4/2013 | Sankar ................ G06F 1/305 713/324 |
| 2013/0198723 A1 | 8/2013 | Gupta et al. |
| 2013/0205092 A1 | 8/2013 | Roy et al. |
| 2014/0189301 A1 | 7/2014 | Gorbatov et al. |
| 2014/0215487 A1 | 7/2014 | Cherkasova et al. |
| 2014/0281647 A1 | 9/2014 | Bodas et al. |
| 2014/0298047 A1* | 10/2014 | Holler ................ G06F 9/5094 713/300 |

OTHER PUBLICATIONS

International Search Report, PCT No. PCT/US2015/054440, dated Jan. 22, 2016, 6 pages.

Bodas, et al., "Simple Power-Aware Scheduler to Limit Power Consumption by HPC System Within a Budget", U.S. Appl. No. 62/040,576, filed Aug. 22, 2014.

* cited by examiner

100

400

500

106

800

CONTROL OF POWER CONSUMPTION

CROSS-REFERENCE TO RELATED APPLICATIONS

The present application may be generally subject-matter related to the U.S. patent application Ser. No. 14/582,795 entitled "Methods and Apparatus to Estimate Power Performance of a Job that Runs on Multiple Nodes of a Distributed Computing System" and filed Dec. 24, 2014; the U.S. patent application Ser. No. 14/582,783 entitled "Method and Apparatus to Generate and Use Power, Thermal and Performance Characteristics of Nodes to Improve Energy Efficiency and Reducing Wait Time for Jobs In the Queue" and filed Dec. 24, 2014; the U.S. patent application Ser. No. 14/582,772 entitled "Methods and Apparatus to Manage Jobs that can and Cannot be Suspended when there is a Change in Power Allocation to a Distributed Computer System" and filed Dec. 24, 2014; the U.S. patent application Ser. No. 14/582,743 entitled "Managing Power Performance of Distributed Computing Systems" and filed Dec. 24, 2014; the U.S. patent application Ser. No. 14/582,756 entitled "Profiling of Job Power and Energy Consumption for a Data Processing System" and filed Dec. 24, 2014; the U.S. patent application Ser. No. 14/582,764 entitled "Power Aware Job Scheduler and Manager for a Data Processing System" and filed Dec. 24, 2014; the U.S. patent application Ser. No. 14/582,979 entitled "Adjustment of Execution of Tasks" and filed Dec. 24, 2014; the U.S. patent application Ser. No. 14/582,988 entitled "Forecast for Demand of Energy" and filed Dec. 24, 2014; and the U.S. patent application Ser. No. 14/582,986 entitled "Computational Unit Selection" and filed Dec. 24, 2014.

TECHNICAL FIELD

The present techniques relate generally to supply of electricity to a facility performing distributed computing. More particularly, the techniques relate to management of power consumption of the facility.

BACKGROUND ART

A variety of computing configurations and systems may consume relatively large amounts of power. Such systems may include those for cloud computing, Big Data analytics, web services, enterprise services, distributed computing, high performance computing (HPC), and so on. The facility housing such systems can require significant energy.

Distributed computing, HPC systems, and other aforementioned configurations may facilitate scientists and engineers to solve complex science, engineering, and business problems using applications that benefit from high bandwidth, low latency networking, and very high compute capabilities. These systems may also execute data storage and retrieval, perform more straightforward tasks, and so on. Unfortunately, again, systems such as distributed systems, HPC systems, and others, which may have hundreds or thousands of processors, servers, or compute nodes performing tasks, typically consume significant power. Such may be especially problematic in the "Big Data" era. Further, variations in power consumption and issues of power allocation may also be problematic.

The competitive business of data and computing services drives manufacturers in the continuous improvement of their processes and products in order to lower production costs and deliver reliable service. Indeed, as technologies advance in services for data, computing, and telecommunications, a competitive need exists to continuously increase consistency of service and the efficiency of power utilization.

BRIEF DESCRIPTION OF DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

Figure 1:
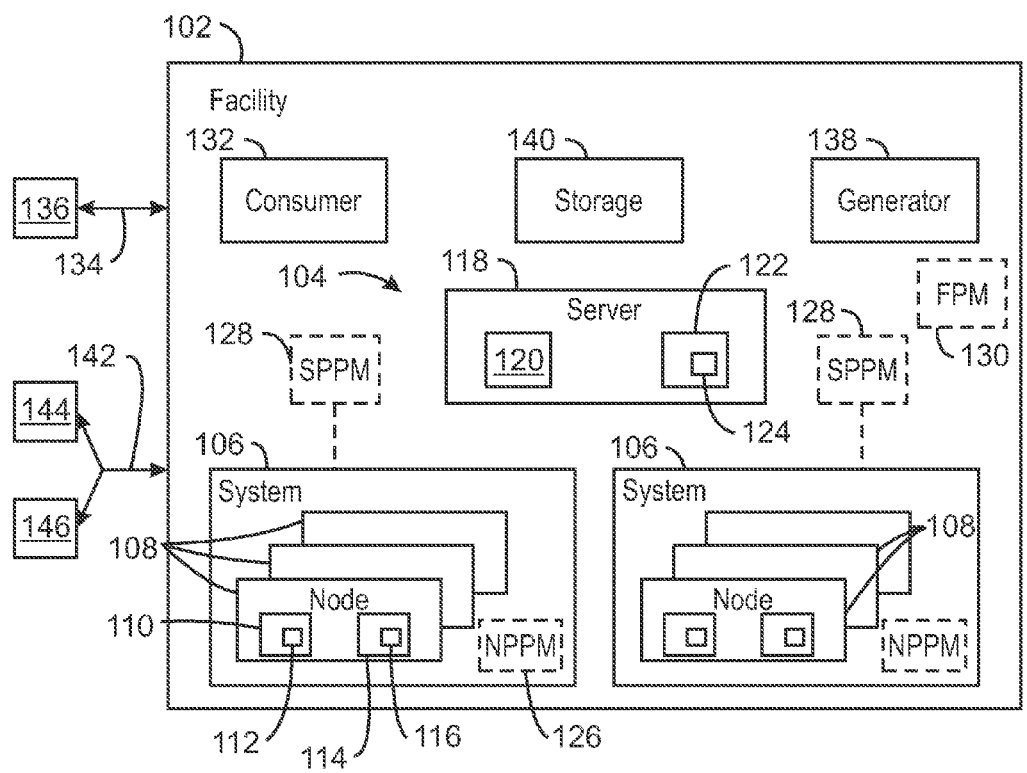
FIG. 1 is a diagrammatical representation of an exemplary distributed computing system in accordance with embodiments of the present techniques.

Embodiments of the present techniques are directed to a facility having systems of multiple compute nodes configured to execute jobs of computing. Power consumption is managed or controlled at the facility to within a power band and/or within a desired or specified ramp or rate of change in power. The rate of change may be some magnitude of Watts per minute or per hour, for example. The management or control of power to within band or ramp may be at the facility level, system level, and job/node level.

Further, it should be noted that controlling power consumption to within a power band is much different than merely only making efforts to use less power or less electricity, as is conventional. Instead, a power band, for example, may be a specified minimum to a specified maximum of power, and in embodiments, the band is a relatively narrow range. For instance, the power band may be related to a negotiated range with a utility provider. A negotiated allocated amount of power from the utility provider to the facility may be a relatively narrow range of power (e.g., an allocation of 10 MW allowed to drop to 8.5 MW but not below). Thus, with the power band, the maximum limit of the band may be an allocated amount of power consumption (e.g., 10 MW). The minimum limit of the band may be the lower amount (e.g., 8.5 MW) that the power consumption is to reach, as negotiated via the allocation. It should be noted that facility use of local energy generation and storage may provide flexibility (e.g., widening the facility control powerband slightly) with respect to power consumption at the facility and satisfying negotiated allocation with the utility provider. Nevertheless, with or without local energy generation/storage, the facility may implement activities to control power consumption at the facility to within power band.

Various activities may be implemented to adjust power consumption. An example of a facility-level activity may be to waste power by lowering the temperature of a cooling system beyond that needed. Such may be implemented to increase power consumption so that the facility power consumption stays within a power band. Another example of a facility-level activity may be to activate or adjust local energy generation/storage to maintain power consumption within power band or within power ramp limits or targets. Energy generation may be from renewable and/or non-renewable sources dispose local to the facility, for example. Energy storage may involve power storage, (e.g., batteries), thermal storage (e.g., ice, cooled liquid), and so on.

To manage and control power, activities with low-priority computational output or no computational output may be implemented at the system and job/node levels to affect power consumption. As discussed below, such activities may be implemented by a power balloon module, at the system level and at the job/node level. The activities may be to increase or decrease power consumption, with respect to both band and rate. For example, a power balloon may specify or initiate an activity that wastes energy so to slow a sudden decrease in power. In another example, a manager module may initiate an activity that increases power with no computational output. For instance, the activity may be to power an idle node (without executing a job on that node) to waste/expend power, so to increase power consumption of the system to above a specified minimum target.

Again, a power balloon or manager module may initiate activities having little or no computation/work output, or no additional computational output, to adjust and control power at the system and/or node levels. These activities may include "green" and "non-green" activities.

The green techniques are useful but produce no computational output or no new computational job output, or no new job work for the client. In other words in particular embodiments, green actions may produce useful work but no computational output for a user or client. Examples of green techniques (implemented by a power balloon or manager to adjust/control power) are diagnostic action and maintenance action on the node or on the system of nodes. At the system level, green activity by the power balloon or manager may include system diagnostics, calibration of unallocated but powered nodes (per node power), maintenance of storage system (compression, virus scan, error detection and correction), maintenance of system memory (error detection and correction), running of low-priority jobs, and so forth. At the node level, green activities initiated by the power balloon or manager may include node diagnostic, calibration of the nodes, maintenance of local storage (compression, virus scan, error detection and correction), maintenance of system memory (error detection and correction), and so forth.

In contrast, non-green techniques are useless activity, except for the intended purpose of wasting energy and being energy inefficient to increase power consumption. Non-green activities implemented via a power balloon or manager produce no useful work, and no output or at least no work output, no computational output (or no additional computational output). The power balloon or manager implements the non-green activity to consume energy to maintain the power consumption at the node or system (and thus at the facility) above lower limits or targets of the power band, or below upper limits or targets of power rate of change.

At the job/node level, non-green actions initiated by the power balloon or manager may include powering off various power features (e.g., features that reduce power and develop energy consumption proportional to computation load and utilization of components), and running various power virus processes, and so forth. At the system level, non-green actions initiated or implemented by the power balloon to control power include powering-on unallocated powered down nodes, turning on a dummy job (per node power), changing energy policy of jobs (to make then run in less energy efficient fashion), and the like.

In configuration and operation, the power balloon or appropriate manager module will select which power balloon activity to apply. The selection may be based on the amount of power that would be consumed by the activity, the amount of power desired to be consumed at the facility, system, or node, and based on the priority of the activities (e.g., of the useful activities), and other considerations.

With respect to computing such as distributed computing, high performance computing (HPC) or Big Data analytics, cloud computing, and so on, the cost of energy to a facility or datacenter, as related to electricity or power, may involve both meter charge and demand charge. Meter charge may be proportional to the amount of energy used over a time period. Demand charge may be a function of the specified demand for allocation of power, the amount of power actually used as a percentage of demand, and the fluctuation or variation in the rate of power consumption, and so on.

Today, a typical specified demand by such a facility or datacenter may be about 1 megawatt (MW) of power, for example. In the future, demand is expected to grow to as much as 45 MW or higher, for instance, especially for facilities or datacenters that host high performance computing (HPC) or super computers, and/or perform Big Data analytics. At such high demand, the demand charge may be greater than the meter charge. To manage and control demand charge at datacenters including datacenters having high predetermined demand, the datacenters in examples may benefit from the following: (1) when X MW of power is allocated, the power consumption should generally not fall below X minus Y MW, where X minus Y may be labeled as a power band; and (2) the fluctuation or variation in power should be generally limited over time, including with rates such as power per minute and power per hour.

At present, capacitors, such as a voltage regulator (VR), power supply, and uninterruptable power supply (UPS), provide protection against relatively small fluctuations of power consumption for small durations. Unfortunately, for a UPS or batteries to support multiple MW consumption would generally require large floor space or real estate, and will be prohibitively expensive in many examples. Conventional solutions will generally not be capable to effectively satisfy controlling rate of power consumption at future datacenters, or at datacenters having relatively large power demand and large actual consumption of power.

In accordance with embodiments of the present techniques, the managing of the rate of power consumption can be generally achieved and implemented by a combination of controlling power consume by computing systems, using energy storage and energy generation, and so on. From an energy/environmental conservation perspective, controls can be generally categorized as green or non-green. In particular, green mechanisms typically facilitate that energy is spent for useful purpose. On the other hand, non-green mechanisms may result in wasted or inefficient expenditure of energy to for the intended purpose of increasing power or slowing a decrease in power. Green and non-green activities can be implemented at facility level, system level, and job/node level. Green activities at the facility level may include using excess energy to: (1) charge batteries to store electrical energy, (2) cool liquid and store the cooled liquid in a reservoir for later use (e.g., to supplement a cooling system), and (3) produce ice to store thermal energy. Facility-level green activities may also include using local generation of energy involving operating renewable energy sources (e.g., solar, wind, geothermal etc.) and/or traditional energy sources such as diesel generators. Facility-level non-green activities may include operating facility racks and the datacenter at low temperature (such may be analogous wasting energy by running air-conditioning with windows open).

Some embodiments herein may employ a hierarchical structure to manage the rate of power consumption. The structure may involve a facility power manager, system power-performance manager, job power-performance manager, and so forth. As discussed below, various mechanisms and structures may be implemented to control rate of power consumption at different levels, e.g., within the manager hierarchy.

As indicated, capacitors at various power delivery levels, e.g., VR, power supply, power distribution units (PDU), UPS with battery, etc., may provide local storage and discharge of energy. At component and system levels, the capacitors may suppress transients at microseconds and milliseconds. In a particular example, for a 1 MW data center, a UPS may support loss of energy for a few minutes. To address upcoming user requirements, such as with 10 MW to 45 MW datacenters, for instance, the extending of traditional approaches may generally be relatively expensive and inadequate. In another particular example, if an HPC job crashes or finishes (completes), the datacenter could experience a 4-6 MW drop in power consumption is milliseconds, for instance. Conventional mechanisms do not protect against or address such an unfortunate and likely scenario. In contrast, as discussed herein, embodiments of the present techniques protect or address sudden and relatively large changes in power consumption at datacenters and facilities for distributed computing including HPC and Big Data analytics.

Historically, efforts in managing power consumption focused on reducing power consumption without consideration of power band. Conversely, embodiments herein accommodate the need that power draw from a utility company or provider be kept close to the power allocation of the datacenter. Again, some embodiments may employ hierarchical targets and controls to manage or control rate of power consumption at the datacenter or similar facility.

A facility or datacenter generally hosts multiple compute systems, energy generators, power storage (e.g., batteries), cooling units, etc. In embodiments, the facility may have a facility-level power manager (FPM) to meet user requirements for variations per minute and per hour, and the FPM to maintain facility consumption within a min-max level or range based upon allocation by the utility supplier entity, for instance. The FPM may generate and provide targets to system level power-performance manager (SPPM) for system level control. The FPM and SPPM may manage variation in power consumption. The SPPM may work with a system of nodes, as well as a job-level power-performance manager or controller, for example, and provide power consumption targets to node-level power performance managers (NPPM). Both the SPPMs and job power-performance managers (JPPM) may comprehend architectures, power usages, and local energy storage to implement various schemes, as discussed below. Thus, again, hierarchical targets and controllers may be implemented, including a hierarchy for controlling to within power band and for controlling rate of power consumption.

FIG. 1 is an exemplary system 100 for computing, such as a distributed computing system, datacenter, supercomputer(s), Big Data analytics center, cloud computing, enterprise services, high performance computing (HPC) center, and so on. Embodiments herein related to facility power level and system power level are generally applicable to various computing configurations. In the illustrated embodiment, the system 100 has a facility 102 with a computing architecture 104 including one or more systems 106 of nodes 108. In an example, the facility 102 includes three systems 106 each having 20,000 nodes 108. In alternate embodiments, the system level may be fluid in the sense that the groupings of nodes 108 can change over time, such as per job. The nodes 108 may generally be compute nodes but can also include operating system (OS) nodes, input/output (I/O) nodes, and other nodes. Each node 108 may include one or more processors 110, wherein each processor 110 has one or more processing cores 112.

Each node 108 may also include memory 114 storing code 116 executable by the processors 108. The nodes 108 may include additional hardware, software, firmware, and so on. The computing architecture 104 may also include one or more computing devices 118, such as servers, hosts, etc., each having at least one processor 120 and memory 122 storing code 124 executable by the processor 120.

The stored executable code 116 and 124 may include various manager or control modules, including managers at different levels in a hierarchy. As mentioned, exemplary managers include node power-performance manager(s) (NPPM), system power-performance(s) (SPPM), and a facility power manager (FPM), as represented by dashed boxes 126, 128, and 130, respectively, and other modules. In embodiments, job power performance managers (JPPM) (not shown) are distributed among the nodes 108. The portion of that JPPM that runs on an individual node is referred to as the NPPM. Again, these controllers or managers 126, 128, 130 are executable code (e.g., 116 and/or 126) stored in memory (e.g., 114 and/or 124). The managers 126, 128, 130 may have submodules are be a part of other modules. Moreover, as indicated, the managers 126, 128, and 130, and other controller modules, may provide for a hierarchical management or control with respect to power. Further, respective variants of the managers 128, 128, 130, and/or other controllers and managers, may provide for in-band or out-of-band control.

As can be appreciated, the computing architecture 104 at the facility 102 may consume power. Additionally, the facility 102 may include other consumers 132 of power, such as a building cooling system, lighting, and so on. The facility 102 may receive electricity or power 134 from one or more utility companies or providers 136, for example. The power 134 received may be subjected to conversion at the facility 102 as needed. Moreover, the facility 102 may also have power generation facilities 138 (e.g., diesel generators, etc.), disposed locally and/or remote. Further, the facility 102 may have power storage 140 such as batteries and other energy storage such as a reservoir for coolant. Lastly, the facility 102 may be in communication (e.g., via a network 142) with other distributed computing systems 144 (e.g., datacenters, super computers, Big Data, etc.), or non-distributed or traditional compute systems and computing devices 146 (e.g., at client locations, utility companies or distributors, and so forth).

Figure 2:
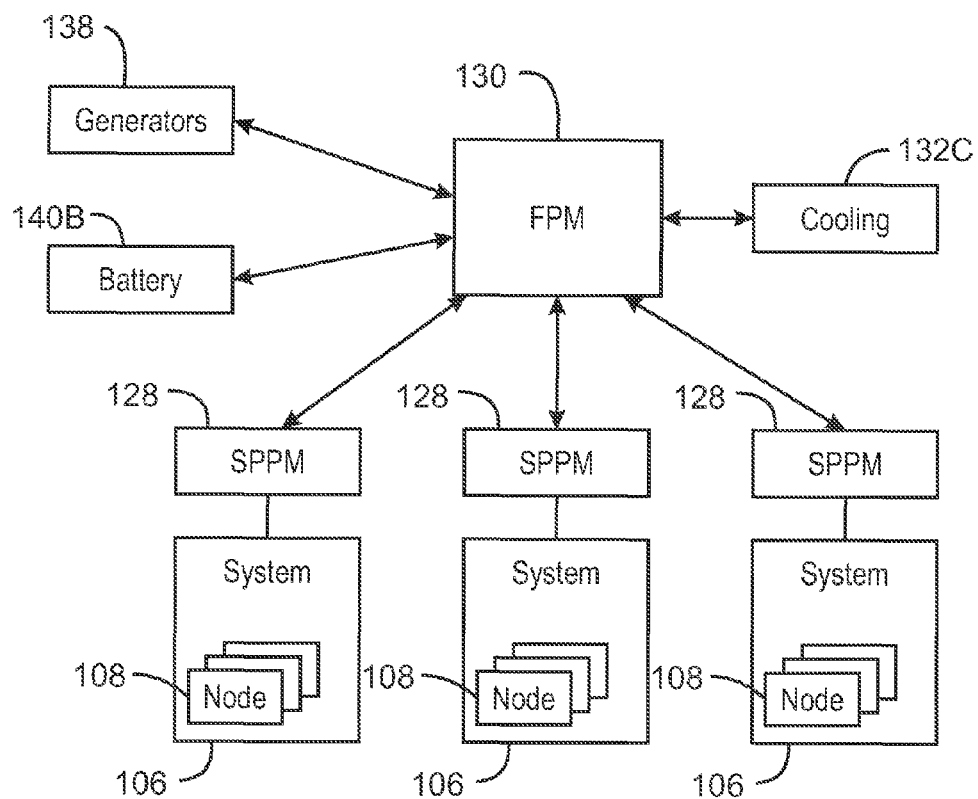
FIG. 2 is a block diagram of an exemplary facility for distributed computing in accordance with embodiments of the present techniques.

FIG. 2 is a diagrammatical representation of an exemplary facility 102 for distributed computing. As mentioned, in some embodiments, a hierarchy may be implemented to manage or control rate of power consumption for the distributed computing system 100 (e.g., datacenter, super computer, etc.) including the facility 102. At the facility level, the facility power manager (FPM) 130 may accommodate requirements for facility power variations per time (e.g., per minute and per hour), and maintain the power consumption at the facility 102 between a minimum power consumption and a maximum power consumption. Such a range may be based on the allocation of power by the utility company or provider, or by a facility manager (e.g., human administrator).

The FPM 130 may generate and provide power targets (e.g., for both consumption and variation) to system power-performance manger (SPPM) 128 for the system level power. The FPM 130 and SPPM 128 may manage variation in power consumption. Based on constraints and targets enunciated by the SPPM 128 and/or other factors, the SPPM 128 may manage the power consumption of its respective system 106 of nodes 108.

Figure 3:
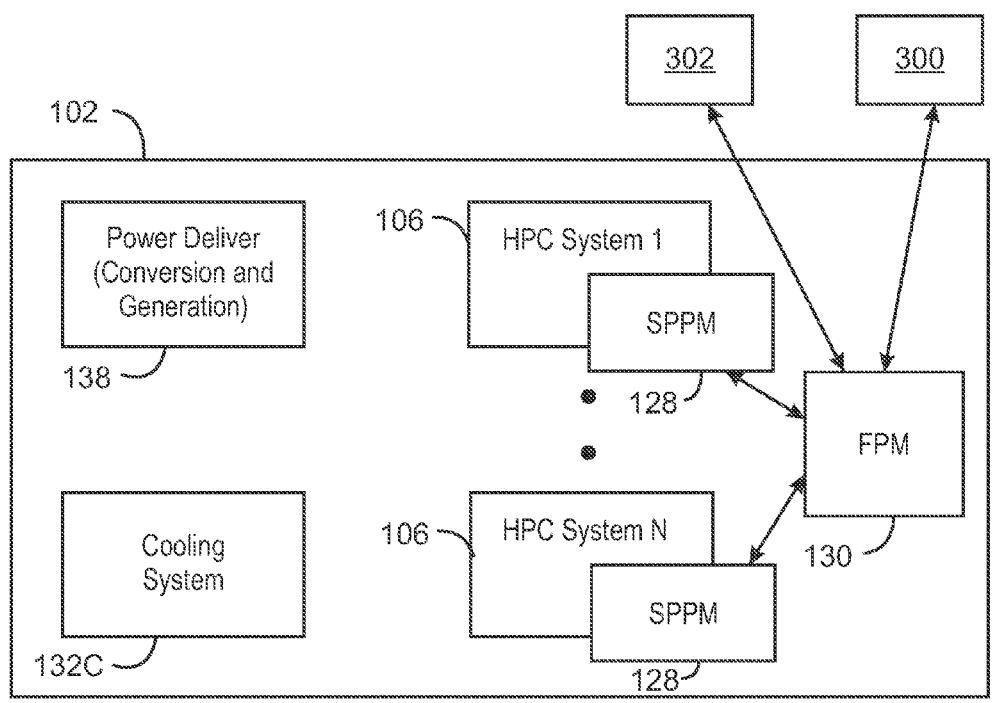
FIG. 3 is a diagrammatical representation of an exemplary facility for distributed computing in accordance with embodiments of the present techniques.

FIG. 3 is an example facility 102 for distributed computing. As discussed, the facility manager FPM 130 gives direction to the multiple system managers SPPM 128 for the systems 106 of nodes. Further, the FPM 130 may communicate with and have policies/rules set by a human administrator 300, utility company or provider 302, and so forth. In examples, the FPM 130 may use or be a demand/response interface to the utility provider 302. Moreover, the FPM 130 may perform accountings of power and cooling at the facility 102, and the like, including to communicate capacity and requirements. The FPM 130 may account for a cooling system 132C, manage co-generation of energy (e.g., at generators 138), allocate power budgets to the one or more SPPM 128, and so forth.

A FPM 130 may use various mechanisms to meet requirements by the datacenter operator with respect to power consumption variation, such as for delta Watts per minute ($\Delta$W/min) and $\Delta$W/hour. A datacenter operator may also have the FPM 130 maintain facility-level power consumption at, or slightly below, power allocation by the utility provider 302. With targets to keep energy efficiency high, the FPM may attempt to use green mechanisms before resorting to non-green mechanisms.

For a facility 102 with local generators 138, the FPM 130 may use local generators 138 for facility control of power. Depending on the particular facility 102, there may be various types of local generators 138. Examples of local generators 138 are diesel engines, solar power, and so forth. In a particular example, if facility 102 demand for power as negotiated with the utility provider 302 is set at say 12 MW, and the facility 102 has local power generation of 2 MW, for instance, then the facility 102 may instead renegotiate demand for 10 MW from the utility provider 302. If so, the utility provider 302 may require the facility 102 draw from the utility provider between 8.5 MW to 10 MW (e.g., allowed variation of 15%), for example. In this numerical example, the 2 MW local generation may facilitate datacenter facility 102 level fluctuation between 8.5 to 12 MW (~30% variation). Local power generation may therefore increase flexibility or level of power, as well as help meet goal(s) for limited variation (e.g., $\Delta$W/hour) over the long term.

For a facility 102 with local power storage 140, FPM 130 may use the power storage (e.g., battery, local refrigeration, etc.). When facility 102 level actual power consumption may fall below minimum demand (say 8.5 MW in the above numerical example), the FPM 130 may channel energy to charge batteries 140B part of power storage 140. The resulting battery charge may later then be used when facility 102 actual demand for power grows. Another approach for energy storage is to use excess energy (e.g., when actual power consumption of the facility drops below negotiated demand) to cool liquid or to generate ice. Ice or cool liquid can be stored and used later for cooling to reduce energy by the cooling system 132C, for example, when actual power consumption of the facility 102 approaches or exceeds demand, i.e., the upper limit of the power band.

Other examples of mechanisms the FPM 130 may employ is for the FPM 130 to designate settings on the cooling systems 132C, such as adjusting the temperature or temperature set point of coolant, air, or water in the cooling system 132C. Such control may affect power consumed by both the cooling system 132C and the computing architecture 104 including the compute systems. For example, to increase facility power consumption, the FPM 130 may lower temperature of outlet the outlet air of an air conditioning unit in the cooling system 132C. Although this may be a non-green mechanism, such lowering of the cooling air temperature may help improve life of components (e.g., in the computing architecture 104) cooled by the air. Therefore, this non-green activity while generally useless could have a benefit other than raising power consumption to within power band.

Figure 4:
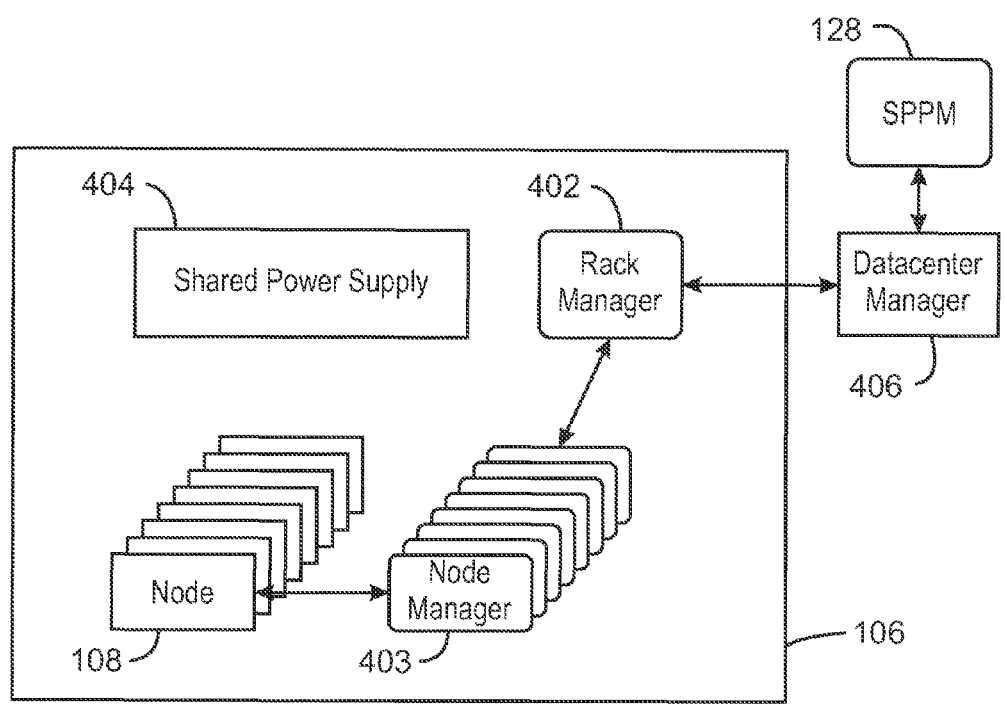
FIG. 4 is a diagrammatical representation of a system level and node level of an exemplary facility for distributed computing in accordance with embodiments of the present techniques.

FIG. 4 is a diagrammatical representation 400 of a system level and node level of an exemplary facility 102 for distributed computing. A Datacenter Manager 406 and a rack controller or manager 402, for example, monitor shared power supply 404 at the system level, and cooling in racks of nodes 108, and so forth. The rack manager 402 may direct node managers 403 (e.g., out-of-band node managers) with respect to monitoring power for the nodes 108, for example. Both in-band and out-of-band management, monitoring, and control may be accommodated. A datacenter manager 406, for example, may part of the out-of-band management hierarchy. A datacenter manager 406 communicates health and capability of power and cooling system to SPPM 128.

In examples, the node manager 403, rack manager 402 and datacenter manager 406 are out-of-band and not a direct part of system software. These three managers 402, 403 and 406 may instead be part of independent mechanism that monitors power and cooling infrastructure for failures, for instance. In cases of failure in power supply or cooling, the rack manager 402 may take action to reduce or prevent resulting undesired events, may communicate with a job manager, resource manager, SPPM so that they will operate the system and nodes comprehending lower power/cooling capability (due to a failure).

As discussed with respect to FIGS. 1-3, in comprehending the facility 102 or datacenter level capability and energy cost of the facility 102, e.g., losses in power and cooling systems, building, etc., the FPM 130 may generate target(s) for power amount or level, and for variation in power, for the respective SPC 128 and systems 106 of nodes 108 (see FIGS. 1-3). These targets may be communicated to the SPC 128 for systems 106 power management and control.

Figure 5A:
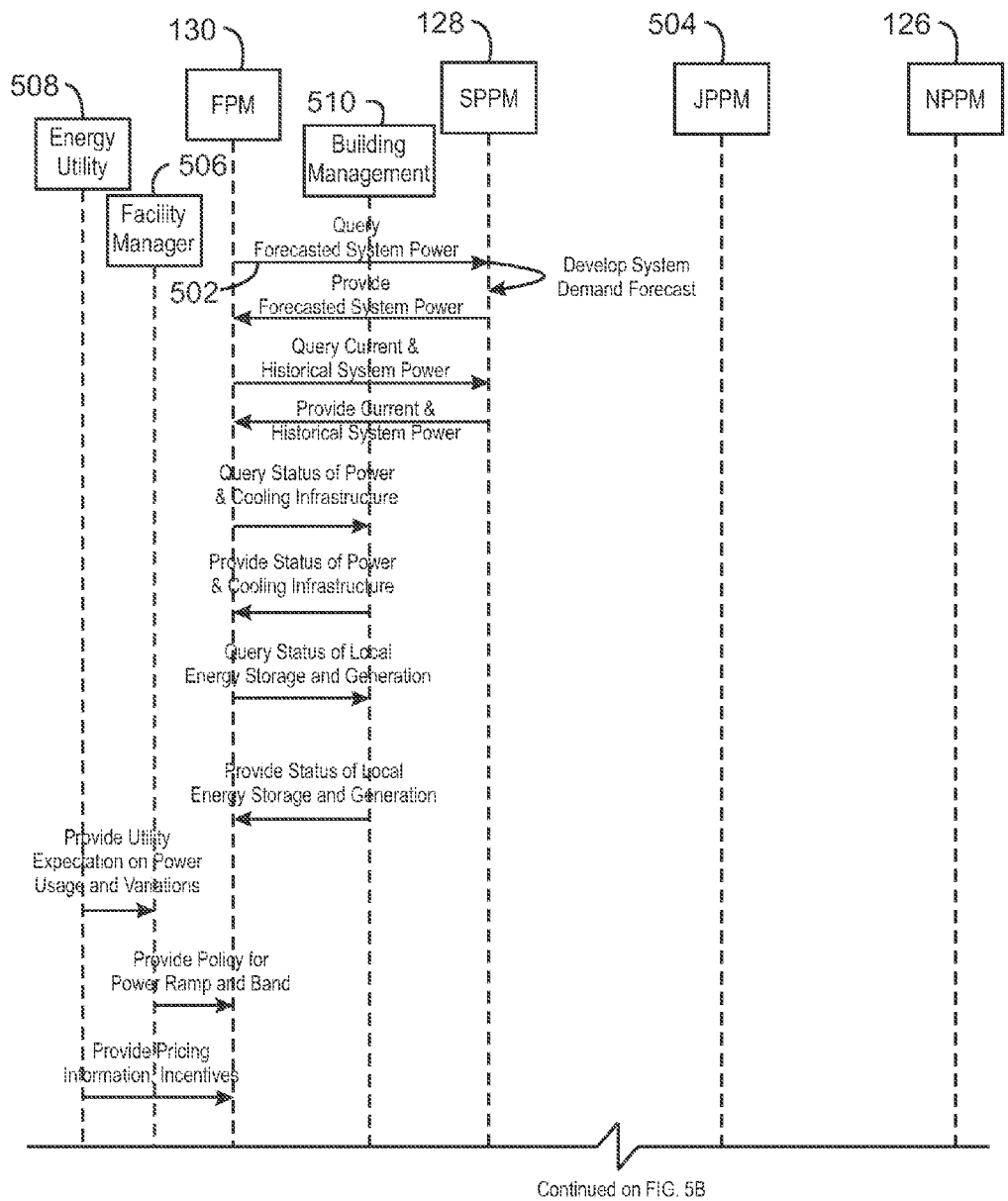
FIGS. 5A and 5B area flow diagram of an example of a power manager hierarchy and actions in accordance with embodiments of the present techniques.
Figure 5B:
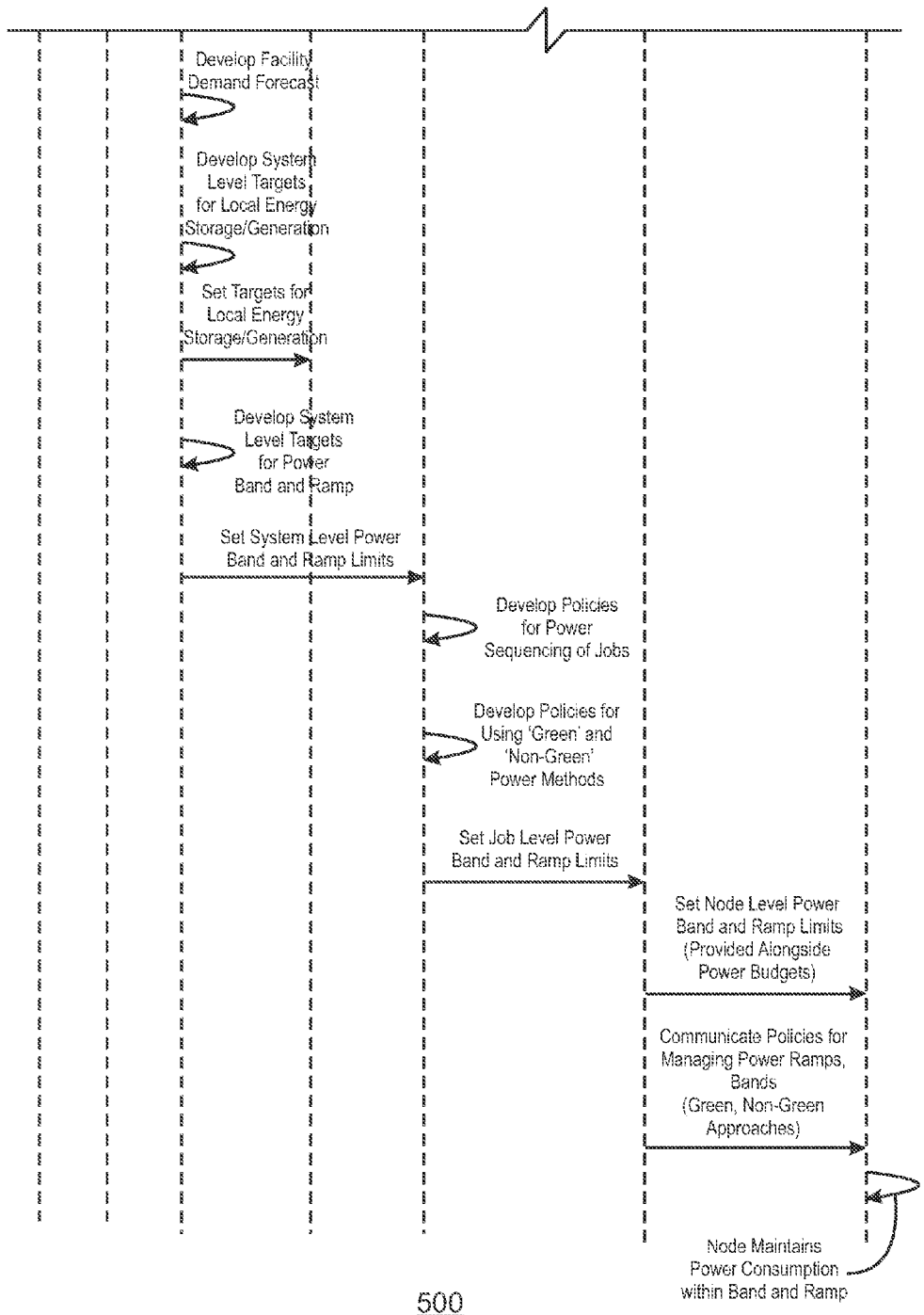

FIGS. 5A and 5B are a flow diagram of an example management hierarchy 500 having exemplary actions 502. FIG. 5A is the top part of the diagram. FIG. 5B is the bottom part of the diagram. Entities in the management hierarchy 500 may include the aforementioned FPM 130, SPPM 128, JPPM 504 and NPPM 126, or variants thereof. In operation, the FPM 130 may manage facility 102 resources and define system power budgets to the one or more SPPM 128. At the system level, a resource manager (not separately depicted) may include, for example, the SPPM 128 and a job power-performance manager (JPPM) 504, and may direct the NPPMs 126 with respect to power consumption (including variation). This power consumption at the system level and the job level may be for the multiple nodes 108 in the systems 106, such as in implementation or execution of a distributed computing job on the nodes 108. Additional entities in the management hierarchy may include a facility manager (e.g., an automated or human administrator), an energy utility 508 (e.g., utility company or provider), building management 510, and so forth.

As discussed with respect to the preceding figures, the FPM 130 may generally communicate via a demand/response interface with an energy utility 508, receive and set rules and policies with a facility manager 506, and manage facility 102 energy resources. The FPM 130 may account for facility 102 power and cooling, including to communicate capacity needs and requirements, manage use of local energy, and allocate budgets to the system (i.e., to the resource manager or SPPM 128).

In the illustrated embodiment, of FIG. 5A, as noted by the actions 502, the FPM 130 may query and receive forecasted system power. The SPPM 128 may develop the system demand forecast. The FPM 130 may also query and receive current and historical system power information from the SPPM 128. Further, the FPM 130 may query and receive the status of the power and cooling infrastructure from building management 510. The FPM 130 may also query and receive from the building management 510 the state of local energy storage and generation.

Moreover, as noted in FIG. 5A, the facility manager 506 may receive a policy for power ramp and power band, and in turn facility manager 506 may set policies and rules for control of power ramp and power band, to the FPM 130. The FPM 130 may receive from the utility energy 508, utility expectation on power usage and variations, as well as pricing information and incentives with respect to energy. Of course, the reverse direction may be realized, in that the FPM 130 may also provide similar information, and other data and information, to the facility manager 506 and the utility energy 508.

Continuing with the diagram to FIG. 5B, the FPM 130 based on the various aforementioned information received, and other information, may develop a facility demand forecast, develop targets and plans for local energy storage/generation and set those targets to building management 510, and develop system level targets for power band and ramp and set those limits to the SPPM 128. In response, the SPPM 128 may develop policies for power sequencing of jobs, develop policies for using "green" and "non-green" power activities, and set job level power band and ramp limits to the JPPM 502.

As depicted as actions 502 in FIG. 5A, the JPPM 502 may set node level power band and ramp limits (e.g., provided alongside power budgets) to the NPPMs 126. The JPPM 502 may also communicate policies for managing power ramps and bands, including green and non-green approaches, to the NPPM 126. The NPPM 126 may maintain power consumption at respective node(s) within band and ramp targets or limits. Lastly, it should be emphasized that other management hierarchies not depicted in FIG. 5, including labels, levels, and configurations, are applicable to the present techniques.

Figure 6:
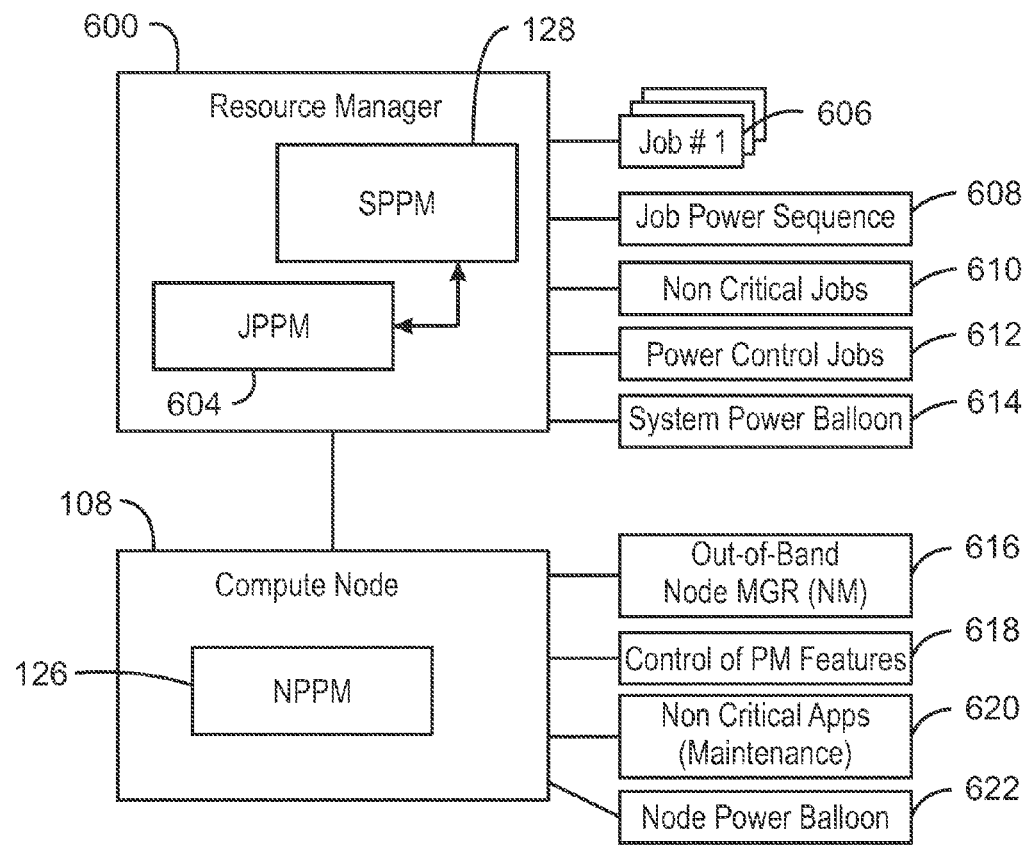
FIG. 6 is block diagram of exemplary managers and functions at the system level and node level in accordance with embodiments of the present techniques.

FIG. 6 is block diagram of exemplary managers and functions at the system level and node level. In a system 106, there may be mechanisms to maintain system 106 power-performance to give relatively high energy efficiency within the system 106 level power budget. The SPPM 128 may work in conjunction with a resource manager 600, for example, to meet requirements for rate of change in power consumption. The resource manager 600 (e.g., executable code directing a processor) may have elements such as job scheduler (not shown), job launcher (not shown), etc., to manage user submitted jobs and launch the jobs in a prioritized order in such a manner to meet a goal, for example, that over 95% of the nodes are used for computations. The resource manager (RM) 600 may have components, such as a system power-performance manager (SPPM) 128 and a job power-performance manager (JPPM) 604 (which may be analogous to 502 of FIGS. 5A and 5B), to manage power-performance of the job. The RM 600 by selecting various types of jobs and controlling gradual increase in job power can help meet the system 106 level target for power consumption.

As for selection of jobs, the RM 600 may select jobs 606 from queues and schedule the jobs 606 for execution. In embodiments, the RM 600 can access tools that estimate power needs for jobs. These estimates may help the RM 600 to select combinations of jobs that may run to meet system 106 level power requirements for power control.

The RM 600 may address power sequencing 608 for a job. In a particular example, if a job starts say on 20,000 nodes 108, there may be thus a sudden increase in power consumption at the system 106 and the facility 102. In certain embodiments, a RM 600 can employ multiple techniques to make this power increase more gradual. For example, the RM 600 may coordinate with the FPM 130 to address systematic power and to make power consumption gradual for the system 106. The FPM 130 can dampen a sudden or stark increase in power consumption by using local energy storage 140 and local energy generation 138. In another example to make a system power increase more gradual, the RM 600 may control performance of compute nodes 108 that run the job in such a way that the nodes start the job at a low (e.g., lowest) frequency. The RM 600 may then gradually in a controlled manner increase the frequency of the nodes 108 executing the job.

As for non-critical jobs 610, when a previous job finishes, the RM 600 may designate running or execution of non-critical but useful jobs. Examples of such jobs 610 may be a system health check, diagnostics, security scan, power-performance calibration of nodes 108, defragmentation of storage devices, scanning and correction of errors in system memory and storage drives, and so forth. These may be green mechanisms that improve reliability of the systems 106 and other facility 102 systems.

A power control job 612 may be a job that generates little or no useful work and consumes energy to maintain power level over minimum. These may clearly be a non-green option. Nevertheless, such power control jobs 612 may help maintain system 106 level power consumption within target. In certain embodiments, these kinds of activities may be implemented via a system power balloon application 614 (e.g., executable code), as discussed in more detail below.

As for power consumption targets for nodes 108, the RM 600 may control power-performance of the node 106 through a job or workload manager, such a JPPM 604. The RM 600 via a JPPM 604, for example, can provide specific targets in certain embodiments so that node 108 level power consumption does not change drastically and suddenly. Again, to meet ramp or band targets, certain activities directed to avoiding sudden changes in power rate (and also to managing power consumption within band), may be implemented via a power balloon technique or mechanism (module or executable code stored in memory). In certain embodiments, there may be a power balloon at both the system level and the node level. The illustrated embodiment depicts a system power balloon 614 and node power balloon 622.

To maintain node 108 level power consumption within target provided by the job manager or JPPM 604, the control of power management (PM) features, as noted in block 618, may be addressed. A reduction in node 108 level power may be the result of power management (PM) or power reduction technologies in a node or a platform. These technologies may reduce component level power when the component's usage or computation load decreases. By disabling PM features in some embodiments, the component level power may remain steady or substantially steady. However, the RM 600 and/or node power balloon 622 may direct the PM for a more gradual approach to reduce power slowly. A more gradual approach may help meet goals for rate of change in power and also may be energy efficient.

Furthermore, non-critical applications 620 may exist for maintenance. In examples with a power drop at a node 108, the RM 600 via the node power balloon 622 may run non-critical but useful applications 620. Although such non-critical applications 620 may not generate computer output for any user, such applications 620 may perform maintenance and therefore improve reliability of the node 108. Examples of such applications include node health check, diagnostics, security scan, calibration of nodes, defragmentation of storage drives, scanning and correction of errors in system memory and storage drives, and the like.

Figure 7:
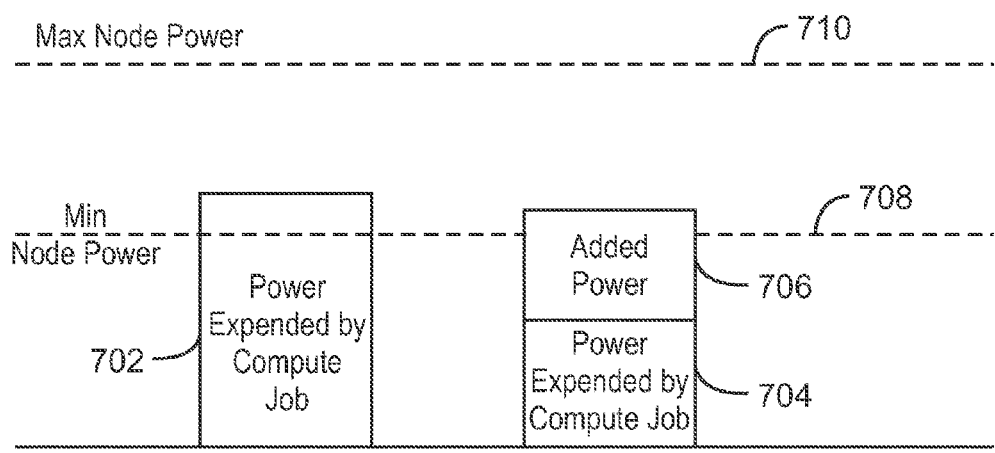
FIG. 7 is a bar chart comparing power consumption of two example jobs of distributed computing in accordance with embodiments of the present techniques.

The SPPM 128, for instance, may implement a present technique called power balloon (see, e.g., FIG. 7). A power balloon (614 and 622) may manage green and non-green applications to (1) maintain system power within a power band and (2) manage system level power fluctuations, and other results. Examples of green applications, as alluded above as non-critical applications 620, may be system health check, diagnostics, security scan, calibration of nodes, defragmentation of storage drives, scanning and correction of errors in system memory and storage drives, and so forth. Examples of non-green applications, such as those implemented by a power balloon application, may be powering on unallocated nodes (unallocated nodes are generally powered down to save energy), running dummy jobs such as a power virus, asking a job manager (or JPPM 502 or 604) to run jobs without being energy efficient, and so on. As mentioned and also depicted in FIG. 6, a power balloon 614, 622 may operate on the system level and the node level, respectively. As for the node level, a node power balloon 622 may provide for a local technique at a node 108. In particular examples, the node power balloon 622 may be a non-green technique in that the node may not generate useful compute output in response to the power balloon activity. The node power balloon 622 may also implement green actions. Again, the same or similar actions (green and non-green) may be implemented on the system level via a system power balloon 614.

FIG. 7 illustrates how a node power balloon 622 can be used to beneficially maintain node 108 power within a band. In some embodiments, this mechanism may be responsive even when there is power consumption change in milliseconds, for instance. The power balloon 622 can be invoked by an operating system, or by an out-of-band mechanism or firmware. In the illustrated embodiment, an out-of-band node manager 616 may invoke the power balloon 622. In general, a power balloon either increases or decrease power to meet requirements for power ramp and for power band control. Further, a power balloon may be implemented at a node level or a system level. In the particular illustrated embodiment of FIG. 7, the power balloon is implemented at the node level and increases power to meet power band. However, power balloon implementation may be equally or similarly applicable or adopted at the system level, and also to adjust or control power ramp, i.e., rate of power change (increase or decrease).

FIG. 7 is a bar chart 700 comparing power consumption of two example compute jobs 702 and 704, or the same compute job at different times, executing on a compute node 108 in a distributed computing system 106. The desired range or band for the node 108 power is from a minimum power 708 to a maximum power 710. The first compute job 702 executes within the desired band. In contrast, the second compute job 704 executes below the desired minimum power 708 for the node 108. However, with implementation of the aforementioned power balloon application 622, the power of node 108 when executing the second job 704 may be increased to at or above the minimum power 708 level, as indicated by the added power 706, to within the desired power band.

In sum, a node-level power balloon 622 can implement green and non-green actions to manage power band and power fluctuations. Green actions or methods may include running node calibration, diagnostic, memory or disc scans to detect and correct errors, virus scan, etc. Non-green actions may include disabling or turning off power reduction features, running a dummy program (e.g., power virus) that consumes power but generates no work output, and so forth. Again, a power balloon implementing the aforementioned actions giving the consequence at the node level depicted in FIG. 7, can also be implemented on the system level (see system power balloon 614 of FIG. 6).

Figure 8:
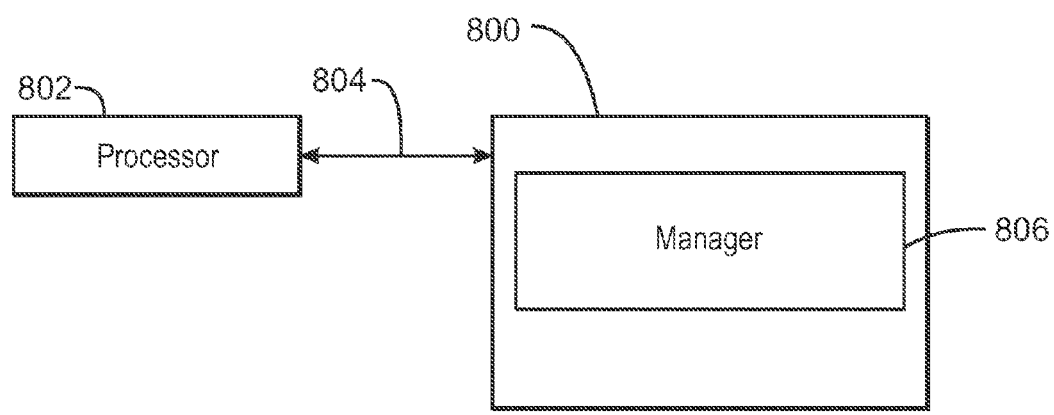
FIG. 8 is a block diagram depicting an example of a tangible non-transitory, computer-readable medium that can facilitate power management of a distributed computing system in accordance with embodiments of the present techniques.

FIG. 8 is a block diagram depicting an example of a tangible non-transitory, computer-readable medium that can facilitate power management of a distributed computing system in accordance with embodiments of the present techniques. The computer-readable medium 800 may be accessed by a processor 802 over a computer interconnect 804. The processor 802 may be one or more compute node processors (e.g., 110), a server processor (e.g., 110, 120), or another processor. The tangible, non-transitory, computer-readable medium 800 may include executable instructions or code to direct the processor 802 to perform the operations of the techniques described herein.

The various software components discussed herein may be stored on the tangible, non-transitory, computer-readable medium 800, as indicated in FIG. 8. For example, a power management/control module 806 (executable code/instructions) may direct the processor 802 to manage and control power consumption and variation at a distributed computing facility. Indeed, the module 806 executable instructions or code may include a FPM, resource manager, SPPM, JPPM, NPPM, system power balloon, node power balloon, and so on. The code or module 806 may be similar or the same as the aforementioned executable code 116, 124 in FIG. 1. It should be understood that any number of additional software components not shown in FIG. 8 may be included within the tangible, non-transitory, computer-readable medium 800, depending on the application.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment", "one embodiment", "some embodiments", "various embodiments", or "other embodiments" means that a particular feature, structure, or characteristic described in connection with the embodiments is included in at least some embodiments, but not necessarily all embodiments, of the present techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Examples are provided. Example 1 is a facility for computing, the facility having systems of multiple compute nodes to execute jobs of computing. The computing facility has memory storing code, wherein the code is executable by the multiple compute nodes or by a processor to manage power consumption of the facility to within a power band, and wherein to manage power consumption comprises to adjust power consumption via a power balloon. The executable code comprises the power balloon.

Example 2 incorporates the subject matter of Example 1. In this example, to adjust power consumption, via the power balloon, controls rate of the power consumption.

Example 3 incorporates the subject matter of any combination of Examples 1-2. In this example, the computing comprises distributed computing and the job comprises a distributed computing job. Further, to manage power consumption includes managing power consumption at a facility level, a system level, and a node level, and wherein the power band comprises a range from a minimum power consumption to a maximum power consumption.

Example 4 incorporates the subject matter of any combination of Examples 1-3. In this example, the power balloon is a node power balloon.

Example 5 incorporates the subject matter of any combination of Examples 1-4. In this example, the power balloon is a system power balloon.

Example 6 incorporates the subject matter of any combination of Examples 1-5. In this example, to adjust power consumption via a power balloon comprises to implement a green technique.

Example 7 incorporates the subject matter of any combination of Examples 1-6. In this example, to adjust power consumption via a power balloon comprises to implement an activity that produces useful work but no computational output for a client.

Example 8 incorporates the subject matter of any combination of Examples 1-7. In this example, to adjust power consumption via a power balloon comprises to implement a non-green technique.

Example 9 incorporates the subject matter of any combination of Examples 1-8. In this example, to adjust power consumption via a power balloon comprises to implement an activity that produces no useful work and no additional computational output, the activity to consume energy to maintain the power consumption at the facility above a minimum limit of the power band.

Example 10 incorporates the subject matter of any combination of Examples 1-9. In this example, to adjust power consumption via a power balloon comprises to run a diagnostic or perform maintenance, or a combination thereof.

Example 11 incorporates the subject matter of any combination of Examples 1-10. In this example, to adjust power consumption via a power balloon comprises to power-on an unallocated powered-down node.

Example 12 incorporates the subject matter of any combination of Examples 1-11. In this example, to adjust power consumption via a power balloon comprises to run a process of power thermal utility to increase energy consumption of a compute node.

Example 13 is a facility for computing, having systems of compute nodes, each system comprising a plurality of the compute nodes to execute jobs of distributed computing. The facility for computing includes memory storing executable code to manage power consumption at the facility, wherein to manage power consumption comprises to control the power consumption to within a power band and to control rate of the power consumption at the facility, by initiating an activity to adjust the power consumption, the activity giving no computational output.

Example 14 incorporates the subject matter of Example 13. In this example, the activity acts on a system of compute nodes or on a compute node, or both, and wherein the facility comprises a cloud computing facility, a distributed computing facility, a high performance computing (HPC) facility, a Big Data analytics facility, or any combination thereof.

Example 15 incorporates the subject matter of any combination of Examples 13-14. In this example, executable code comprises a power balloon to initiate the activity.

Example 16 is a method of computing, including executing jobs of computing on systems of computing at a facility, wherein each system comprises multiple compute nodes. The method includes managing, via a processor, power consumption at the facility to within a power band via a power balloon comprising implementing green activities and non-green activities.

Example 17 incorporates the subject matter of Example 16. In this example, managing power consumption comprises controlling rate of power consumption.

Example 18 incorporates the subject matter of any combination of Examples 16-17. In this example, the power balloon is at a node level.

Example 19 incorporates the subject matter of any combination of Examples 16-18. In this example, the power balloon is at a system level.

Example 20 incorporates the subject matter of any combination of Examples 16-19. In this example, managing power consumption via a power balloon comprises implementing an activity that produces useful work but no computational output for a client.

Example 21 incorporates the subject matter of any combination of Examples 16-20. In this example, managing power consumption via a power balloon comprises implementing an activity that produces no useful work and no additional computational output, wherein the activity is implemented to consume energy to maintain the power consumption at the facility above a minimum limit of the power band.

Example 22 incorporates the subject matter of any combination of Examples 16-21. In this example, the computing comprises distributed computing, the system comprises a distributed computing system, and the facility comprises a distributed computing facility.

Example 23 is a non-transitory, computer-readable medium comprising instructions executable by a processor to manage, via a power balloon implementing green techniques and non-green techniques, power consumption at a facility for distributed computing to within a power band, the facility comprising systems of multiple compute nodes, and wherein to manage power consumption comprises to control rate of power consumption at a facility level, a system level, and a compute node level. The executable instructions include the power balloon.

Example 24 incorporates the subject matter of Example 23. In this example, to manage power consumption via the power balloon comprises to implement an activity on a system of compute nodes at the facility to produce useful work but no computational output for a user, and wherein the power band comprises a range from a minimum power consumption to a maximum power consumption.

Example 25 incorporates the subject matter of any combination of Example 23-24. In this example, to manage power consumption via a power balloon comprises to initiate an activity on a system of compute nodes at the facility to produce no useful work and no additional computational output, wherein the activity is implemented to consume energy to maintain the power consumption at the facility above a minimum limit of the power band.

Example 26 is an apparatus for managing power consumption at a facility for distributed computing, comprising means for managing, via a power balloon implementing green techniques and non-green techniques, power consumption of the facility to within a power band, the facility comprising systems of multiple compute nodes, and wherein to manage power consumption comprises to control rate of power consumption at a facility level, a system level, and a compute node level.

Example 27 incorporates the subject matter of Example 26. In this example, the means for managing power consumption via a power balloon comprises means for implementing an activity on a system of compute nodes at the facility to produce useful work but no computational output for a user, and wherein the power band comprises a range from a minimum power consumption to a maximum power consumption.

Example 28 incorporates the subject matter of any combination of Examples 26-27. In this example, the means for managing power consumption via a power balloon comprises means for initiating an activity on a system of compute nodes at the facility to produce no useful work and no additional computational output, wherein the activity is implemented to consume energy to maintain the power consumption at the facility above a minimum limit of the power band.

Example 29 is a facility for computing, the facility having systems of multiple compute nodes to execute jobs of computing. The computing facility having memory storing executable code to manage power consumption of the facility to within a power band, wherein to manage power consumption comprises to control rate of power consumption, and wherein to manage power consumption comprises to adjust power consumption via a power balloon.

Example 30 incorporates the subject matter of Example 29. In this example, the computing comprises distributed computing and the job comprises a distributed computing job, wherein to manage power consumption comprises to manage power consumption at a facility level, a system level, and a node level, and wherein the power band comprises a range from a minimum power consumption to a maximum power consumption.

Example 31 incorporates the subject matter of any combination of Examples 29-30. In this example, the power balloon comprises a node power balloon.

Example 32 incorporates the subject matter of any combination of Examples 29-31. In this example, the power balloon comprises a system power balloon.

Example 33 incorporates the subject matter of any combination of Examples 29-32. In this example, to adjust power consumption via a power balloon comprises to implement a green technique comprising to implement an activity that produces useful work but no computational output for a client.

Example 34 incorporates the subject matter of any combination of Examples 29-33. In this example, to adjust power consumption via a power balloon comprises to implement a non-green technique comprising to implement an activity that produces no useful work and no additional computational output, the activity to consume energy to maintain the power consumption at the facility above a minimum limit of the power band.

Example 35 incorporates the subject matter of any combination of Examples 29-34. In this example, to adjust power consumption via a power balloon comprises to run a diagnostic or perform maintenance, or a combination thereof.

Example 36 incorporates the subject matter of any combination of Examples 29-35. In this example, to adjust power consumption via a power balloon comprises to run a process of power thermal utility to increase energy consumption of a compute node.

Example 37 is a method of computing, including executing jobs of computing on systems of computing at a facility, wherein each system comprises multiple compute nodes. The method includes managing, via a power balloon, power consumption at the facility to control rate of power consumption and to control power within a power band, the power balloon implementing green activities and non-green activities.

Example 38 incorporates the subject matter of Example 37. In this example, managing power consumption via the power balloon comprises implementing an activity that produces useful work but no computational output for a client.

Example 39 incorporates the subject matter of any combination of Examples 37-38. In this example, in managing power consumption via the power balloon comprises implementing an activity that produces no useful work and no additional computational output, wherein the activity is implemented to consume energy to maintain the power consumption at the facility above a minimum limit of the power band.

Example 40 incorporates the subject matter of any combination of Examples 37-39. In this example, managing power consumption via the power balloon comprises to power-on an unallocated powered-down node.

Example 41 is a non-transitory, computer-readable medium comprising instructions, including a power balloon, executable by a processor to manage power consumption of a facility to control rate of power consumption of the facility and to control power consumption of the facility to within a power band, the power balloon implementing green activities and non-green activities, and wherein the facility comprises a distributed computing facility.

Example 42 incorporates the subject matter of Example 41. In this example, to manage power consumption via the power balloon comprises implementing an activity that produces useful work but no computational output for a client.

Example 43 incorporates the subject matter of any combination of Examples 41-42. In this example, to manage power consumption via the power balloon comprises implementing an activity that produces no useful work and no additional computational output, wherein the activity is implemented to consume energy to maintain the power consumption at the facility above a minimum limit of the power band.

Example 44 incorporates the subject matter of any combination of Examples 41-43. In this example, to manage power consumption via the power balloon comprises to power-on an unallocated powered-down node.

Example 45 incorporates the subject matter of any combination of Examples 41-44. In this example, the power balloon is configured for a node level.

Example 46 incorporates the subject matter of any combination of Examples 41-45. In this example, the power balloon is configured for a system level.

Example 47 incorporates the subject matter of any combination of Examples 41-46. In this example, to manage power consumption via the power balloon comprises implementing an activity that produces no useful work and no additional computational output.

Example 48 incorporates the subject matter of any combination of Examples 41-47. In this example, the distributed computing facility comprises high performance computing (HPC) systems comprising compute nodes.

Example 49 incorporates the subject matter of any combination of Examples 41-48. In this example, to manage power consumption via the power balloon comprises to implement a green technique.

Example 50 incorporates the subject matter of any combination of Examples 41-49. In this example, to adjust power consumption via the power balloon comprises to implement a non-green technique.

Example 51 is a facility for computing, the facility having systems of multiple compute nodes configured to execute jobs of computing, and memory storing code executable by the multiple compute nodes or by a processor to manage power consumption of the facility to within a power band.

Example 52 incorporates the subject matter of Example 51. In this example, the computing comprises distributed computing and the job comprises a distributed computing job, wherein to manage power consumption comprises to manage power consumption at a facility level, a system level, and a node level, and to utilize local energy storage or local energy generation, or both.

Example 53 incorporates the subject matter of any combination of Examples 51-52. In this example, the code includes a power balloon, and wherein to manage the power consumption comprises to adjust the power consumption via the power balloon.

Example 54 incorporates the subject matter of any combination of Examples 51-53. In this example, to adjust power consumption, via the power balloon, controls rate of the power consumption.

Example 55 incorporates the subject matter of any combination of Examples 51-54. In this example, the power balloon comprises a node power balloon.

Example 56 incorporates the subject matter of any combination of Examples 51-54. In this example, the power balloon comprises a system power balloon.

Example 57 incorporates the subject matter of any combination of Examples 51-56. In this example, to adjust power consumption via the power balloon comprises to implement a green technique.

Example 58 incorporates the subject matter of any combination of Examples 51-57. In this example, to adjust power consumption via the power balloon comprises to implement an activity that produces useful work but no computational output for a client.

Example 59 incorporates the subject matter of any combination of Examples 51-58. In this example, to adjust power consumption via the power balloon comprises to implement a non-green technique.

Example 60 incorporates the subject matter of any combination of Examples 51-59. In this example, to adjust power consumption via the power balloon comprises to implement an activity that produces no useful work and no additional computational output, the activity to consume energy to maintain the power consumption at the facility above a minimum limit of the power band.

Example 61 incorporates the subject matter of any combination of Examples 51-60. In this example, to adjust power consumption via the power balloon comprises to run a diagnostic or perform maintenance, or a combination thereof.

Example 62 incorporates the subject matter of any combination of Examples 51-61. In this example, to adjust power consumption via the power balloon comprises to power-on an unallocated powered-down node.

Example 63 incorporates the subject matter of any combination of Examples 51-62. In this example, to adjust power consumption via the power balloon comprises to run a process of a power thermal utility to increase energy consumption of a compute node.

Example 64 incorporates the subject matter of any combination of Examples 51-63. In this example, to manage the power consumption comprises to control rate of the power consumption.

Example 65 incorporates the subject matter of any combination of Examples 51-64. In this example, to control rate of power consumption comprises to adjust operating frequency of the compute nodes to affect power sequencing in order to reduce initial power consumption caused by start of a job.

Example 66 incorporates the subject matter of any combination of Examples 51-65. In this example, to manage power consumption comprises to utilize local energy storage.

Example 67 incorporates the subject matter of any combination of Examples 51-66. In this example, to manage power consumption comprises to utilize local energy generation.

Example 68 is a method of computing including executing jobs of computing on systems of computing at a facility, wherein each system has multiple compute nodes. The method includes managing, via a processor, power consumption of the facility to within a power band and to control rate of power consumption.

Example 69 incorporates the subject matter of Example 68. In this example, managing power consumption comprises managing power consumption via a power balloon.

Example 70 incorporates the subject matter of Example 69. In this example, the power balloon is at a system level or a node level, or both, and managing the power consumption via the power balloon comprises implementing a green activity, which produces useful work but no computational output for a client.

Example 71 incorporates the subject matter of any combination of Examples 69-70. In this example, managing the power consumption via the power balloon comprises implementing a non-green activity on a system of multiple compute nodes and that produces no useful work and no additional computational output, wherein the activity is implemented to consume energy to maintain the power consumption at the facility above a minimum limit of the power band.

Example 72 incorporates the subject matter of any combination of Examples 68-71. In this example, managing power consumption comprises controlling rate of power consumption at a facility level, a system level, job level, and a compute node level.

Example 73 incorporates the subject matter of any combination of Examples 68-71. In this example, managing power consumption comprises controlling rate of power consumption at a job level.

Example 74 incorporates the subject matter of any combination of Examples 68-73. In this example, the systems comprise high performance computing (HPC) systems.

Example 75 incorporates the subject matter of any combination of Examples 68-74. In this example, the power balloon is at a system level or a node level, or both.

Example 76 is a facility for computing, the facility comprising: systems of multiple compute nodes configured to execute jobs of distributed computing; and memory storing code executable by the multiple compute nodes or by a processor to manage power consumption of the facility to within a power band, and to control rate of the power consumption.

Example 77 incorporates the subject matter of Examples 76. In this example, to manage power consumption comprises to manage power consumption at a facility level, a system level, and a node level, and to utilize local power storage or local power generation, or both.

Example 78 incorporates the subject matter of any combination of Examples 76-77. In this example, the code comprises a power balloon, and wherein to manage power consumption comprises to adjust power consumption via the power balloon implementing a green technique that produces useful work but no computational output for a client.

Example 79 incorporates the subject matter of any combination of Examples 76-78. In this example, the code comprises a power balloon, and wherein to manage power consumption comprises to adjust power consumption via the power balloon implementing a non-green activity that produces no useful work and no additional computational output, the non-green activity to consume energy to maintain the power consumption at the facility above a minimum limit of the power band.

Example 80 incorporates the subject matter of any combination of Examples 76-79. In this example, the non-green activity comprises to power-on an unallocated powered-down node.

Example 81 incorporates the subject matter of any combination of Examples 76-80. In this example, to manage power consumption comprises to adjust power consumption via a power thermal utility to increase energy consumption of a compute node.

Example 82 incorporates the subject matter of any combination of Examples 76-81. In this example, to control rate of power consumption comprises to adjust operating frequency of the compute nodes to affect power sequencing in order to reduce initial power consumption caused by start of a distributed computing job.

Example 83 is a non-transitory, computer-readable medium comprising instructions executable by a processor to manage power consumption by a facility to within a power band and to control rate of power consumption by the facility, the facility having distributed computing systems having multiple compute nodes.

Example 84 incorporates the subject matter of Example 83. In this example, to manage power consumption comprises to manage power consumption at a facility level, a system level, and a compute node level, and wherein the power band comprises a range from a specified minimum power consumption to a specified maximum power consumption.

Example 85 incorporates the subject matter of any combination of Examples 83-84. In this example, the instructions executable by the processor comprise a power balloon, and wherein to manage power consumption comprises to adjust power consumption via the power balloon implementing a green activity that produces useful work but no computational output for a user.

Example 86 incorporates the subject matter of any combination of Examples 83-85. In this example, instructions executable by the processor comprise a power balloon, and wherein to manage power consumption comprises to adjust power consumption via the power balloon implementing a non-green activity that produces no useful work and no additional computational output, wherein the activity is implemented to consume energy to maintain the power consumption at the facility above a specified minimum limit of the power band.

It is to be understood that specifics in the aforementioned examples may be used anywhere in one or more embodiments. For instance, all optional features of the computing device described above may also be implemented with respect to either of the methods described herein or a computer-readable medium. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A facility for distributed computing, the facility to receive a power draw from a utility, the facility comprising one or more processors and nodes to execute jobs of the facility, wherein the facility is arranged in a hierarchy comprising:
   a facility-level power manager (FPM) performing the steps of:
      activating a local generator to provide a source of local power; employing local energy storage to store power; and activating a cooling system to waste power;
      allocating a system power portion to systems within the facility, wherein a sum of the system power portions results in a power value within a power band, wherein the power band is a difference between a power draw from a utility servicing the facility and a specified amount of power;
      monitoring the system power portions of each system within the facility to detect system power usage fluctuations according to the power value;
      based upon the detection of the system power portions below a minimum limit of the power band, invoking non-green mechanisms to maintain the power value of the system power portions above the minimum limit of the power band based upon the detection of the system power portions above a maximum limit of the power band;
      based upon the detection of the system power portions above a maximum limit of the power band, invoking green mechanisms to maintain the power value of the system power portions below the maximum limit of the power band;
      wherein the green mechanisms perform at least one of a node diagnostic, calibration of the node, maintenance of local storage, or maintenance of system memory, and wherein non-green mechanisms perform at least one of disabling power reduction features or running a program that consumes power but generates no work output of the system;
      delegating system power budgets of each system to system-level power performance managers (SPPM), wherein each of the system-level power performance managers comprise a respective resource manager;
   each of the system-level power performance managers (SPPM) performing the steps of:
      allocating a node power portion of the delegated system power budget to each node within each of the respective systems; and
      delegating usage of the node power portions of each node to the respective resource manager;
      maintaining the usage of each of the respective node power portions to within the power band by each of the resource managers by performing the steps of:
      selecting jobs based on each of the jobs individual power needs;
      initially executing the selected jobs at a low frequency of the node, then gradually increasing the frequency of the node during the execution;
      once the execution is complete for the selected jobs, maintaining the respective node power portions above the minimum limit and below the maximum limit of the power band by performing one or more of the following: turning on or off power management features of the node; running non-critical but useful jobs to maintain power consumption; executing a power control job to burn energy to maintain power consumption; and invoking a power balloon to waste power.

2. The facility of claim 1, wherein the hierarchy further comprises: a node-level power performance manager (NPPM) to manage variation in power consumption by the jobs in a compute non by: controlling the power management features of the node; running non-critical but useful applications; and running a power balloon; wherein the NPPM receives power allocation from the SPPM.

3. The facility of claim 1, the local generator further comprising a diesel engine or a solar device, wherein the local power produced by the local generator dampens any sudden increase in power consumption by the facility and is added to the power draw to increase an available variation of power consumption by the facility and still be within the power band.

4. The facility of claim 1, wherein the local energy storage comprises a green mechanism, the local energy storage further comprising a battery or refrigeration device, wherein the stored power mitigates any sudden decrease in power consumption by the facility such that the power consumption remains within the power band.

5. The facility of claim 1, wherein the cooling system is a non-green mechanism, the cooling system further comprising an air conditioning unit of the facility, wherein the FPM activates the air conditioning unit to mitigate any sudden decrease in power consumption by the facility such that the power consumption remains within the power band.

6. The facility of claim 1, wherein the FPM implements a green mechanism before implementing a non-green mechanism such that the power consumption remains within the power band.

7. The facility of 1, wherein the non-critical jobs run by the SPPM resource manager are green mechanisms to improve reliability of the system, wherein the non-critical jobs are selected from a croup consisting of: system health checks, diagnostics, security scan, power performance calibration of nodes, defragmentation of storage drives, scanning of errors in system memory, correction of errors in system memory, scanning of errors in storage drives, and correction of errors in storage drives.

8. The facility of claim 1, wherein the resource manager coordinates with the FPM to systematically and gradually increase power available to the system.

9. The facility of claim 1, wherein the power control jobs run by the resource manager of the SPPM are non-green mechanisms.

10. The facility of claim 1 wherein the facility comprises a cloud computing facility, a distributed computing facility, a high performance computing (HPC) facility, a Big Data analytics facility, or any combination thereof, and wherein the facility comprises at least 60,000 compute nodes and the system comprises at least 20,000 compute nodes.

11. The facility of claim 2, wherein the NPPM controls the power management features by turning off or reducing power management of a component of the node.

12. The facility of claim 2, wherein the non-critical but useful applications run by the NPPM are green mechanisms and are selected from a group consisting of: node health check, diagnostics, security scan, calibration of nodes, defragmentation of storage drives, scanning of errors in system memory, correction of errors in system memory, scanning of errors in storage drives, and correction of errors in storage drives.

13. The facility of claim 2, wherein the power balloon is a local application run at the node that does not generate a useful compute output but is run to maintain node power consumption within a target.

14. The facility of claim 13, wherein the power balloon is invoked by an operating system and is responsive to a power consumption change at the node within milliseconds.

15. The facility of claim 13, wherein the power balloon is invoked by an out-of-band mechanism and is responsive to a power consumption change at the node within milliseconds.

16. A method of maintaining power consumption of a facility to within a power band, the method comprising:
   allocating, by a facility manager, a system power portion to each system within the facility, wherein a sum of the system power portions results in a power value within the power band, wherein the power band is a difference between a power draw from a utility servicing the facility and a specified amount of power;
   monitoring, by the facility manager, the system power portions of each system within the facility to detect system power usage fluctuations according to the power value;
   based upon the detection of the system power portions below a minimum limit of the power band, invoking, by the facility manager non-green mechanisms to maintain the power value of the system power portions above the minimum limit of the power band
   based upon the detection of the system power portions above a maximum limit of the power band, invoking, by the facility manager, green mechanisms to maintain the power value of the system power portions below the maximum limit of the power band;
   wherein the green mechanisms perform at least one of a node diagnostic, calibration of the nodes, maintenance of local storage, or maintenance of system memory, and non-green mechanisms perform at least one of disabling power reduction features or running a program that consumes power but generates no work output of the system;
   delegating, by the facility manager, system power budgets of each system to respective system managers; and
   allocating, by the respective system managers, a node power portion of the delegated system power budget to each node within each of the respective systems; and
   delegating, by the respective system managers, usage of the node power portions of each node to respective node managers;
   maintaining, by each respective node manager, the usage of respective node power portions to within the power band by performing the steps of:
   executing a compute job on the node; and
   once the compute job completes execution, maintain the respective node power portions above the minimum limit and below the maximum limit of the power band by performing one or more of the following: turning on or off power management features of the node; run non-critical but useful applications; and invokes a power balloon to waste power.

17. The method of claim 16, wherein the non-critical but useful applications run by the node manager are green mechanisms and are selected from a group consisting of: node health check, diagnostics, security scan, calibration of nodes, defragmentation of storage drives, scanning of errors in system memory, correction of errors in system memory, scanning of errors in storage drives, and correction of errors in storage drives.

18. The method of claim 16, wherein the node manager controls the power management features by turning off or reducing power management of a component of the node.

19. A non-transitory computer-readable medium, which is not a signal bearing medium, comprising instructions executable by a processor performing the steps of:
   allocate, by a facility manager, a system power portion to each system within a facility, wherein a sum of the system power portions results in a power value within a range, wherein the range is a difference between a power draw from a utility servicing the facility and a specified amount of power;
   monitor, by the facility manager, the system power portions of each system within the facility to detect system power usage fluctuations according to the power value; and
   based upon the detection of the system power portions below a minimum limit of the range, invoke, by the facility manager, non-green mechanisms to maintain the power value of the system power portions above the minimum limit of the power band
   based upon the detection of the system power portions above a maximum limit of the power band, invoking, by the facility manager, green mechanisms to maintain the power value of the system power portions below the maximum limit of the power band;
   wherein the green mechanisms perform at least one of a node diagnostic, calibration of the nodes, maintenance of local storage, or maintenance of system memory, and non-green mechanisms perform at least one of disabling power reduction features or running a program that consumes power but generates no work output of the system;
   delegate, by the facility manager, system power budgets of each system to respective system managers; and
   allocate, by the respective system managers, a node power portion of the delegated system power budget to each node within each of the respective systems; and
   delegate, by the respective system managers, usage of the node power portions of each node to respective node managers;
   maintaining, by each respective node manager, the usage of respective node power portions to within the power band by performing the steps of:

executing a compute job of the node; and once the compute job completes execution, maintain the respective node power portions above the minimum limit and below the maximum limit of the range by performing one or more of the following: turning on or off power management features of the node; runs non-critical but useful applications; and invokes a power balloon to waste power.

20. The non-transitory, computer-readable medium of claim 19, wherein a green mechanism invoked by the facility manager comprises local energy storage, wherein the power stored in the local energy storage mitigates any sudden decrease in power consumption by the facility such that the power consumption remains within the range.

21. The non-transitory, computer-readable medium of claim 19, wherein the system manager initially executes jobs at a low frequency, then gradually increases the frequency of execution such that the power consumption remains within the range.

22. The non-transitory, computer-readable medium of claim 19, wherein a non-green mechanism comprises an air conditioning unit of the facility, wherein the facility manager activates the air conditioning unit to mitigate any sudden decrease in power consumption by the facility such that the power consumption remains within the range.

* * * * *